(12) United States Patent
Tsui et al.

(10) Patent No.: US 8,976,002 B2
(45) Date of Patent: Mar. 10, 2015

(54) UNIVERSAL REMOTE CONTROL SYSTEM

(71) Applicants: Philip Yu Wing Tsui, Fo Tan (HK);
Gallen Ka Leung Tsui, Brampton (CA)

(72) Inventors: Philip Yu Wing Tsui, Fo Tan (HK);
Gallen Ka Leung Tsui, Brampton (CA)

( * ) Notice: Subject to any disclaimer, the term of this patent is extended or adjusted under 35 U.S.C. 154(b) by 0 days.

(21) Appl. No.: 13/970,923

(22) Filed: Aug. 20, 2013

(65) Prior Publication Data
US 2014/0055234 A1    Feb. 27, 2014

(30) Foreign Application Priority Data

Aug. 23, 2012 (CA) .................................. 2789040

(51) Int. Cl.
| | | |
|---|---|---|
| G05B 19/00 | (2006.01) | |
| H01H 3/20 | (2006.01) | |
| G07C 9/00 | (2006.01) | |
| E05F 15/16 | (2006.01) | |
| E05F 15/20 | (2006.01) | |
| G08C 17/02 | (2006.01) | |
| G05B 19/042 | (2006.01) | |
| E05F 15/00 | (2006.01) | |

(52) U.S. Cl.
CPC ........ *G07C 9/00007* (2013.01); *E05F 15/1607* (2013.01); *E05F 15/2076* (2013.01); *G08C 17/02* (2013.01); *G05B 19/042* (2013.01); *E05Y 2400/854* (2013.01); *E05Y 2400/856* (2013.01); *E05F 15/00* (2013.01); *G08C 2201/92* (2013.01); *G08C 2201/50* (2013.01); *E05Y 2600/00* (2013.01); *E05Y 2800/692* (2013.01); *E05Y 2800/00* (2013.01); *G05B 2219/23039* (2013.01); *G05B 2219/2628* (2013.01); *E05Y 2900/106* (2013.01)

USPC ......... 340/5.22; 340/5.64; 200/556; 200/538; 200/50.36; 200/51.16; 200/520; 200/523; 200/318.1

(58) Field of Classification Search
CPC ..... H01H 23/145; H01H 23/148; H01H 3/00; H01H 3/26; H01H 3/28; H01H 3/264; E05F 15/00; E05F 15/1607; E05F 15/2076; E05F 15/2092; E05F 2015/128; G08C 2201/50; G08C 2201/92; G05B 2219/2628; G05B 2219/23039
USPC .................................. 340/5.22; 200/538, 556
See application file for complete search history.

(56) References Cited

U.S. PATENT DOCUMENTS 2,870,288 A  *   1/1959  Schmidt ........................... 335/69
3,697,905 A  *  10/1972  Athans, Jr. ......................... 335/1

(Continued)

FOREIGN PATENT DOCUMENTS

DE      102005045332       4/2007

*Primary Examiner* — Firmin Backer
*Assistant Examiner* — Adnan Aziz

(57) ABSTRACT

A universal remote control system is disclosed. The universal remote control includes a receiver that has a wireless signal receiver unit, an electric motor that drives a mechanical arm and a microprocessor. When the receiver receives a control signal from a wireless signal transmitter, the microprocessor will energize the motor which drives the mechanical arm toward a pushbutton switch of a controlled device, such as a garage door opener, and depresses the push button, therefore activating the garage door opener. A feedback signal, for example, from the mechanical arm or the motor, may be provided to the microprocessor to inform the microprocessor when the pushbutton switch is sufficiently depressed and is in an engaged state. When the switch is in the engaged state, the motor will reverse its direction, causing the mechanical arm to raise and move back to a standby position.

23 Claims, 8 Drawing Sheets

(56) References Cited

U.S. PATENT DOCUMENTS

| | | | |
|---|---|---|---|
| 4,338,553 A * | 7/1982 | Scott, Jr. | 318/266 |
| 4,405,923 A * | 9/1983 | Matsuoka et al. | 340/5.71 |
| 4,750,118 A * | 6/1988 | Heitschel et al. | 700/90 |
| 5,864,297 A * | 1/1999 | Sollestre et al. | 340/5.23 |
| 6,118,243 A * | 9/2000 | Reed et al. | 318/468 |
| 6,172,475 B1 * | 1/2001 | Fitzgibbon et al. | 318/266 |
| RE37,986 E * | 2/2003 | Heitschel et al. | 700/90 |
| 7,315,143 B2 * | 1/2008 | Mullet et al. | 318/280 |
| 7,372,355 B2 * | 5/2008 | Agronin et al. | 337/126 |
| 2002/0126037 A1 * | 9/2002 | Fitzgibbon | 341/176 |
| 2003/0227370 A1 * | 12/2003 | Brookbank et al. | 340/5.7 |
| 2005/0194243 A1 * | 9/2005 | Prineppi | 200/556 |
| 2007/0176788 A1 * | 8/2007 | Mor et al. | 340/825.72 |
| 2010/0117578 A1 * | 5/2010 | Hollenbeck | 318/461 |

* cited by examiner

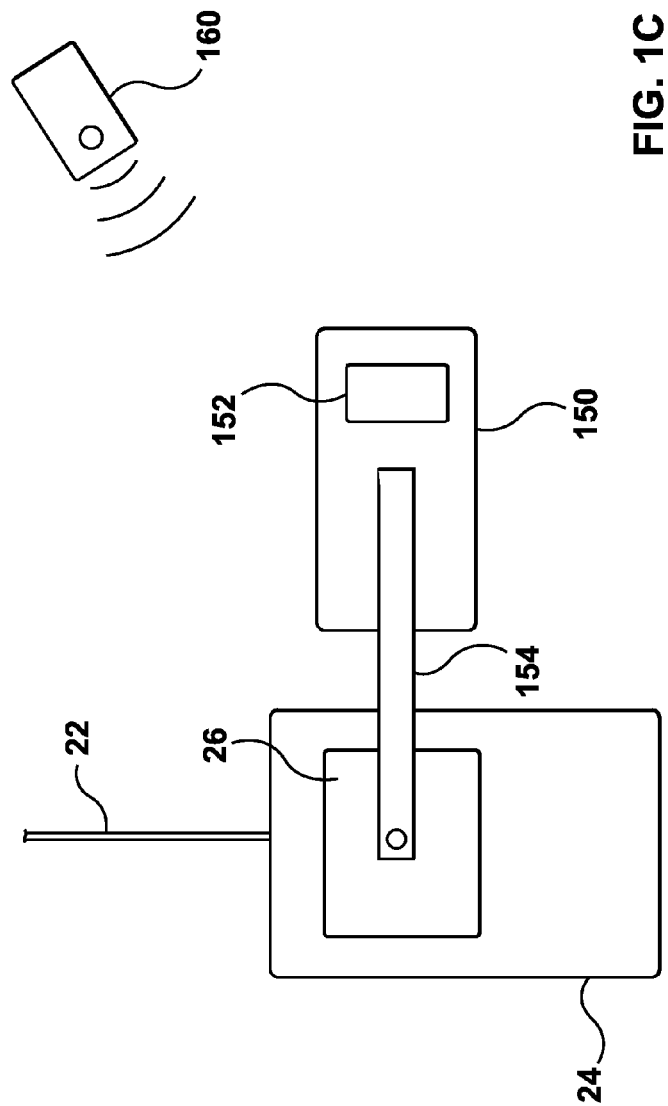
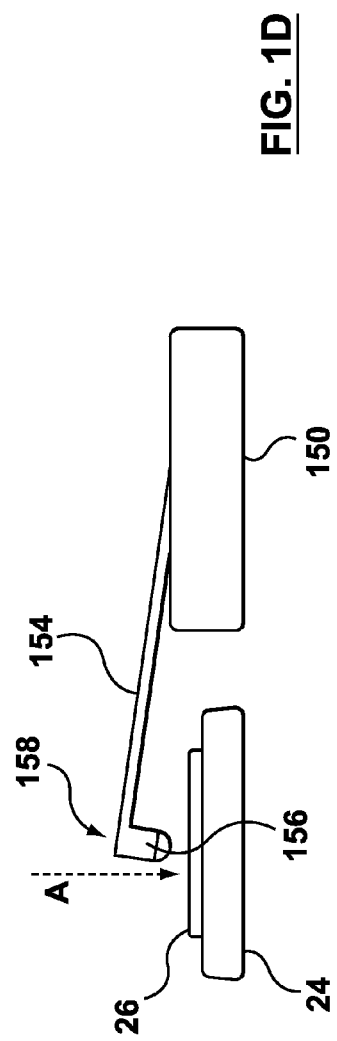
FIG. 1C
FIG. 1D

UNIVERSAL REMOTE CONTROL SYSTEM

FIELD OF INVENTION

The invention relates generally to the field of remote control devices. In particular, the invention relates to a universal remote control system.

BACKGROUND OF INVENTION

Universal remote control, such as replacement garage door remote control, has been around for many years. It is commonly used to replace an original remote when the original remote is lost, out of order or when a new remote is needed. Universal garage door remote is designed to operate multiple brands of garage door openers by selecting the brand of a garage door opener, which then will transmit coded control signal to the garage door opener that is coded specific to that brand and at a specific frequency.

There are many garage door opener manufacturers and therefore, universal transmitters need to store many coded signals. Some manufacturers even have multiple coded signals and therefore, the memory size of the universal transmitter must be large enough to store all the coded signals.

From the user's stand point, selecting the correct brand or the proper coded signal could be a challenge when the number of brands or coded signals stored in the memory increases. The steps to set up a universal garage door opener may be unnecessarily complicated when there are so many brands to choose from.

Another kind of universal garage door remote control consists of a transmitter and a receiver. The receiver has a relay output which is connected to and for actuating the push button of the garage door opener. This kind of garage door opener remote control does not involve communicating directly with the original garage door opener. The coded signals therefore do not need to match with that of the original garage door opener. However, this type of system generally requires users to connect a wire from the receiver to the push button. This type of system also will not work if that specific push button is a wireless push button, which means there is no wire between the push button to the opener unit, or if that opener unit does not accept a relay output signal, also known as a momentary contact signal from the push button.

Therefore, there is a need to have a universal garage door remote control system that is simple to set up, without having to select a specific brand of coded signals or a coded signal among many for a brand from a database, and requires no additional wiring to the existing push button as the push button may not have a wire connected to the opener or the opener may not accept a momentary contact signal from a relay at the push button wire connection.

The forgoing creates challenges and constraints for providing a universal remote control system that may be used to replace a remote control system for a typical garage door opener. There is therefore a need for a universal remote control system for a garage door opener as compared to the existing art. It is an object of the present invention to mitigate or obviate at least one of the above mentioned disadvantages.

SUMMARY OF INVENTION

The present invention is directed to a universal remote control system, which may be used for controlling a barrier control system, such as a garage door opener. According to one embodiment of the present invention, the universal remote control system includes a wireless signal transmitter operable by a user for sending a control signal to control or operate a remotely controlled apparatus or device, such as a garage door opener. The garage door opener typically includes a pushbutton switch, or a wall console with a pushbutton switch, installed in a garage for a user to open or close a garage door directly, without having to operate a garage door opener remote control unit. A receiver unit is installed inside the garage adjacent the wall console or the pushbutton switch. The receiver unit has a wireless signal receiver, an electric motor that drives a mechanical arm and a microprocessor that controls the operation of the electric motor. When the receiver receives a control signal from a recognized transmitter, the microprocessor will energize the motor which drives the mechanical arm in a reciprocal action, such as up and down. When the arm is lowered, with its distal end driven toward the pushbutton switch, the mechanical arm (or its distal end) depresses the push button, therefore activating the garage door opener. A feedback signal, for example, generated at the mechanical arm or the motor, may be provided to the microprocessor to inform the microprocessor when the pushbutton switch is depressed fully (or sufficiently depressed) such that the switch is in an engaged state. When the switch is in the engaged state, the motor will stop and/or reverse its direction, causing the mechanical arm to raise and move back to a standby position. Alternatively, the microprocessor may be configured to move the mechanical arm toward the pushbutton for a fixed time or distance to place the switch in an engaged state.

In a first aspect of the invention, there is provided a remote control system for use with a barrier control system, the barrier control system having a wall-mounted control console with a pushbutton switch, a pushbutton of the pushbutton switch being depressible to urge the pushbutton switch into an engaged state to trigger the barrier control system to open or close a movable barrier. The remote control system comprises a receiver unit that comprises a wireless signal receiver, an electric motor, a movable arm driven by the electric motor, the movable arm having a distal end for depressing the pushbutton to urge the pushbutton switch into the engaged state, and a microprocessor communicating with the wireless signal receiver unit and controlling operation of the electric motor. The microprocessor is configured to energize the electric motor to move the distal end toward the pushbutton to depress the pushbutton upon the wireless signal receiver receiving a recognized wireless control signal from a user controlled wireless signal transmitter. Optionally, a sensing arrangement may be provided, which is coupled to the microprocessor. The sensing arrangement is configured to detect that the pushbutton switch is in the engaged state and communicate the state to the microprocessor. The microprocessor stops moving the distal end of the movable arm toward the pushbutton when the engaged state is detected and communicated to the microprocessor.

As one feature, the electric motor is a direct current (DC) motor and the microprocessor is configured to control the DC motor to move the distal end away from the pushbutton by reversing direction of DC current applied to the DC motor upon the engaged state being detected. As another feature, the microprocessor is configured to control the electric motor to move the distal end toward the pushbutton for a pre-set period of time and move the distal end away from the pushbutton after the end of the pre-set period is reached.

As yet another feature, the sensing arrangement is configured to detect resistance to the distal end moving toward the pushbutton and use the resistance to determine if the pushbutton switch is in the engaged state. As a further feature, the motor is a DC motor and the resistance is detected by detecting a current increase in the DC motor. As an additional further feature, the microprocessor is configured to control the electric motor to move the distal end away from the pushbutton when the current increase reaches a pre-set threshold value.

As yet another feature, the length of the movable arm is user adjustable. As an additional further feature, the movable arm comprises a main arm and an extension arm extending away from the main arm, the extension arm having a telescopic construction to enable a user to adjust the length of the movable arm.

As another feature, the receiver unit further comprises a transmission unit coupled between the electric motor and the movable arm, the transmission unit converting rotational output of the electric motor to reciprocal motion of the distal end of the movable arm. As a further additional feature, the transmission unit converts a low torque input from the electric motor to a high torque output.

In other aspects the invention provides various combinations and subsets of the aspects and features described above.

BRIEF DESCRIPTION OF DRAWINGS

For the purposes of description, but not of limitation, the foregoing and other aspects of the invention are explained in greater detail with reference to the accompanying drawings, in which:

FIG. 1C illustrates in a detailed view a receiver unit of the universal remote control system installed next to a wall console;

FIG. 1D illustrates in a side view the receiver unit installed next to a wall console shown in FIG. 1C;

DETAILED DESCRIPTION OF EMBODIMENTS

Figure 1A:
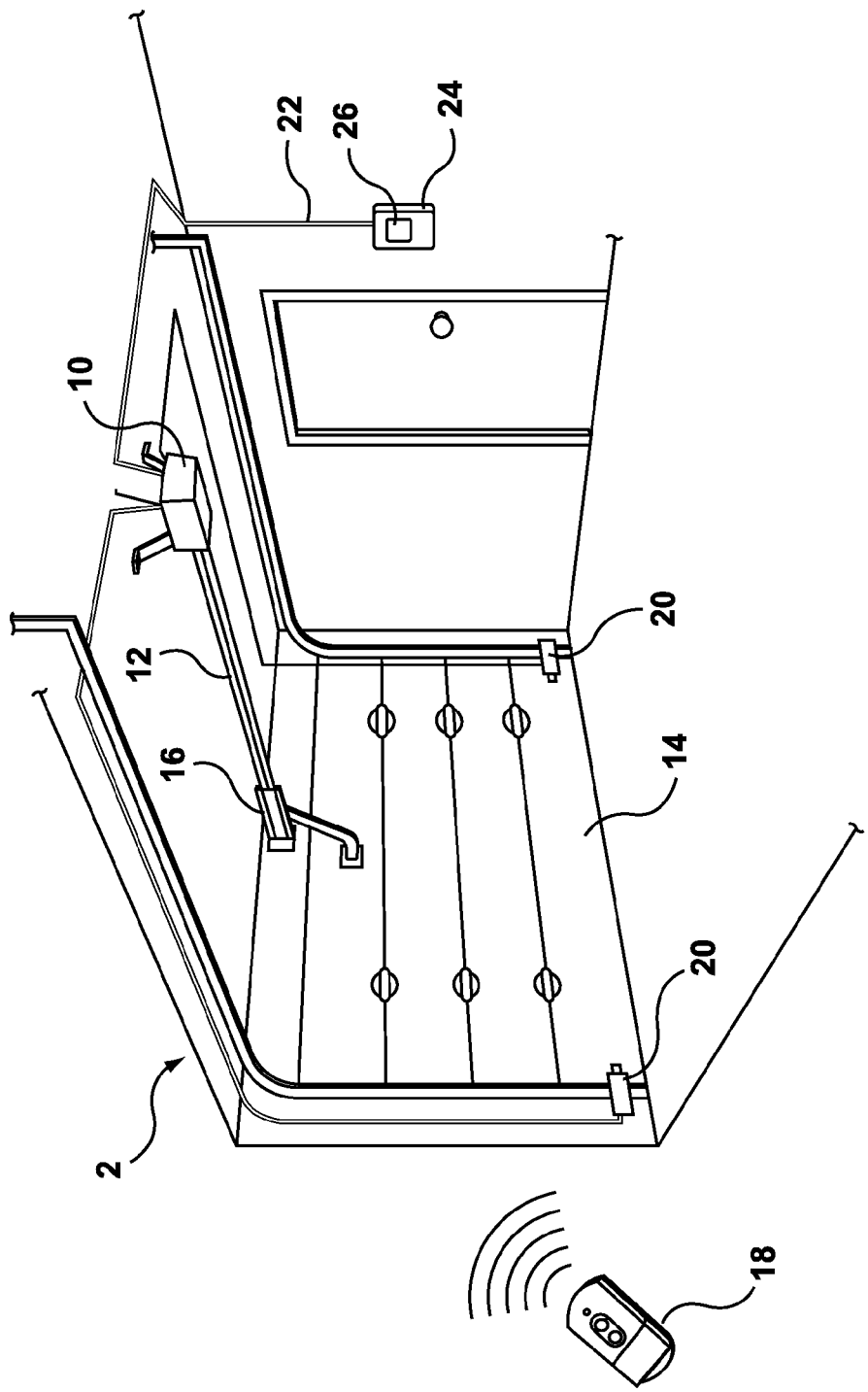
FIG. 1A illustrates a typical setup of a garage, with a garage door opener and a prior art remote control system.

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals. In the description, reference may also be made to the general environment of the invention.

The present invention is directed to a universal remote control system, which may be used for controlling a barrier control system, such as a garage door opener. According to one embodiment of the present invention, the universal remote control system includes a wireless signal transmitter operable by a user for sending a control signal to control or operate a remotely controlled apparatus or device, such as a garage door opener. The garage door opener typically includes a pushbutton switch, or a wall console with a pushbutton switch, installed in a garage for a user to open or close a garage door directly, without having to operate a garage door opener remote control unit. A receiver unit is installed inside the garage adjacent the wall console or the pushbutton switch. The receiver unit has a wireless signal receiver, an electric motor that drives a mechanical arm and a microprocessor that controls the operation of the electric motor. When the receiver receives a control signal from a recognized transmitter, the microprocessor will energize the motor which drives the mechanical arm in a reciprocal action, such as up and down. When the arm is lowered, with its distal end driven toward the pushbutton switch, the mechanical arm (or its distal end) depresses the push button, therefore activating the garage door opener. A feedback signal, for example, generated at the mechanical arm or the motor, may be provided to the microprocessor to inform the microprocessor when the pushbutton switch is depressed fully (or sufficiently depressed) such that the switch is in an engaged state. When the switch is in the engaged state, the motor will stop and/or reverse its direction, causing the mechanical arm to raise and move back to a standby position. Alternatively, the microprocessor may be configured to move the mechanical arm toward the pushbutton for a fixed time or distance to place the switch in an engaged state.

Referring to FIG. 1A, which illustrates a typical setup of a garage 2 with a garage door opener 10 and a prior art remote control system. A side wall of the garage 2 is omitted from the figure for better illustration of the interior of the garage. Garage door opener 10 is mounted on the ceiling of the garage, with a rail 12 attached to it. A moveable barrier, such as a garage door 14, provides controlled access to the garage. Trolley 16 is attached to a motor drive mechanism such as a chain or a belt, which is then connected to a motor (not shown) inside the garage door opener 10. Trolley 16 is also attached to the door 14 so when the motor in the garage door opener is energized, the trolley will move along the rail 12, causing the garage door to open or close. A safety beam sensor 20 and a corresponding beam emitter 22 are installed near the moving path of the door 14. When the beam between the safety beam sensor 20 and the beam emitter 22 is broken or blocked, the door will stop closing down, and avoid causing damage to the object blocking the beam, such as a parked car.

The garage door opener 10 can be controlled by a remote control 18. Remote control 18 operates wirelessly and can be positioned outside the garage and its movable barrier, namely door 14. Wireless signal generated by and transmitted from remote control 18 is received by a receiver installed inside the garage, which may be conveniently built into the garage door opener 10. Once the signal from the remote control 18 is verified by the receiver, the motor will be energized, causing the door to open or close. The garage door opener can also be operated by pressing a pushbutton 26 of a pushbutton switch on a wall console 24. The wall console is installed inside the garage, i.e. behind the movable barrier 14, and is connected to the garage door opener 10 by a pair of wires 22. When the garage door opener detects the button activation, it will energise the motor to open or close the door 14.

Figure 1B:
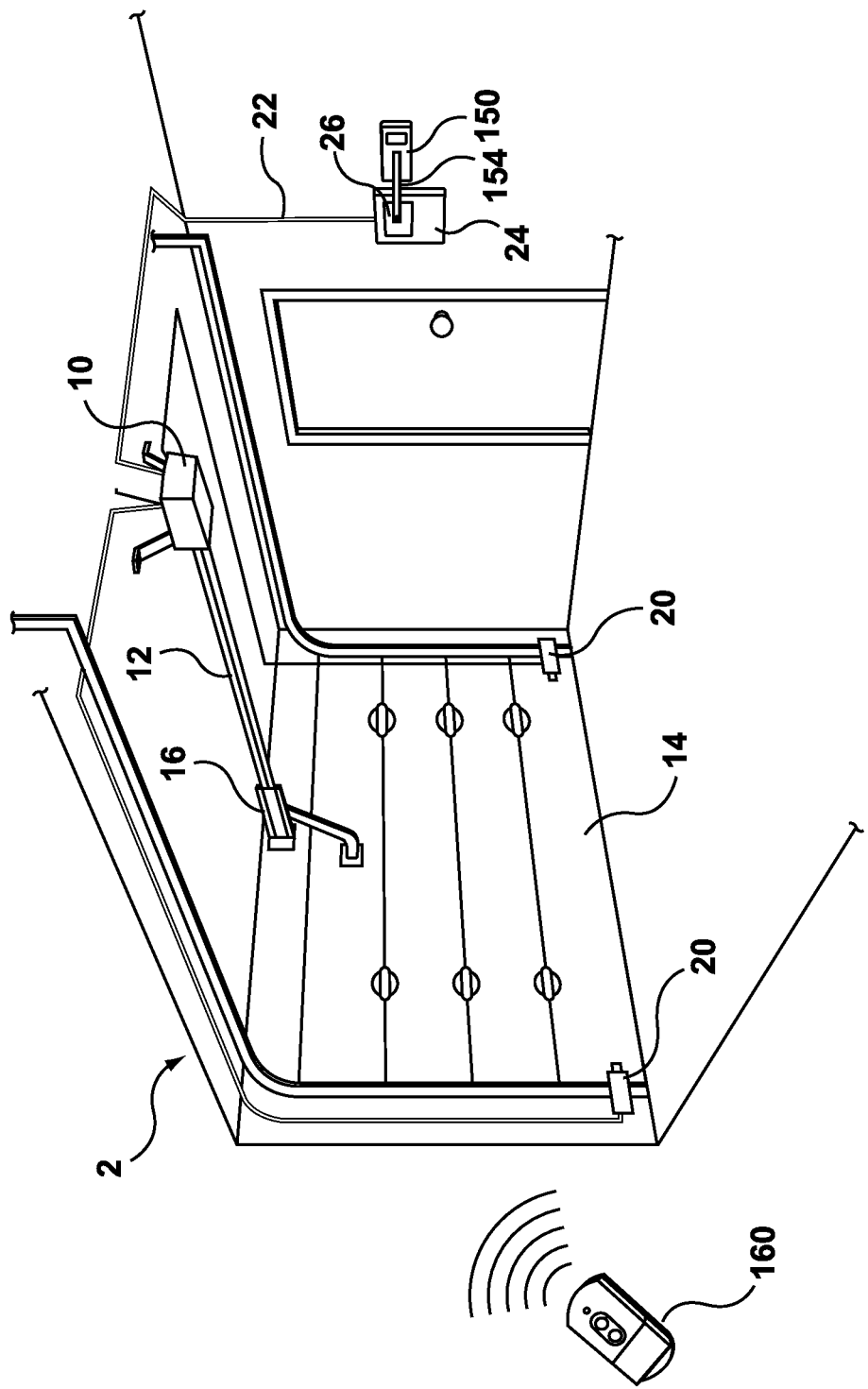
FIG. 1B illustrates a garage with a universal remote control system in accordance with an embodiment of the present invention.

FIG. 1B illustrates a setup with a universal remote control system according to an embodiment of the present invention. FIG. 1C illustrates in a detailed view a receiver unit 150 of the universal remote control system of FIG. 1B installed next to a wall console 24 of an existing garage door control system. FIG. 1D illustrates in a side view a receiver unit 150 shown in FIG. 1C.

Receiver unit 150 includes a movable arm 154 and is mounted adjacent wall console 24. Wall console 24 is that of an existing garage door control system and provides a push button switch for operating the garage door opener. The distal end 158 of movable arm 154 is positioned adjacent the pushbutton switch for depressing the pushbutton 26, generally along the direction of a pushbutton being pushed down as indicated by line A. The distal end 158 is adapted for depressing the pushbutton, for example, by forming a finger 156 thereat. Thus, reciprocal motion of the finger 156 towards and away from the pushbutton switch generally along the direction of line A moves the finger 156 to depress and release the pushbutton 26 of the pushbutton switch. The pushbutton switch is urged into an engaged state when the pushbutton is sufficiently depressed. As will be appreciated, wall console 24 (or the push button switch) is not limited to that of a garage door opener. It may be that of any controlled device, such as an entrance gate, a motorized curtain system, remotely controlled lighting system, among others.

A remote control transmitter 160 according to this embodiment does not communicate with the receiver built into the garage door opener 10. Instead, remote control transmitter 160 communicates wirelessly, e.g., in radio frequency (RF), with a wireless signal receiver 152 inside the receiver unit 150. Remote control 160 is programmed to receiver 152. In other words, a wireless signal emitted by remote control 160 is recognized by the receiver 152, for example, by a unique transmitter identification code of the remote control 160 that is encoded in a section of the transmitted wireless signal. When a wireless signal from remote control 160 is received by receiver 152, receiver 152 will respond by causing the mechanical arm 154 to lower and move the finger 156 toward the pushbutton. Thus, the mechanical arm (or the finger) will make contact with the pushbutton 26 of the wall console 24 and press down the pushbutton to urge the switch into an engaged state to open or close the garage door.

Figure 2:
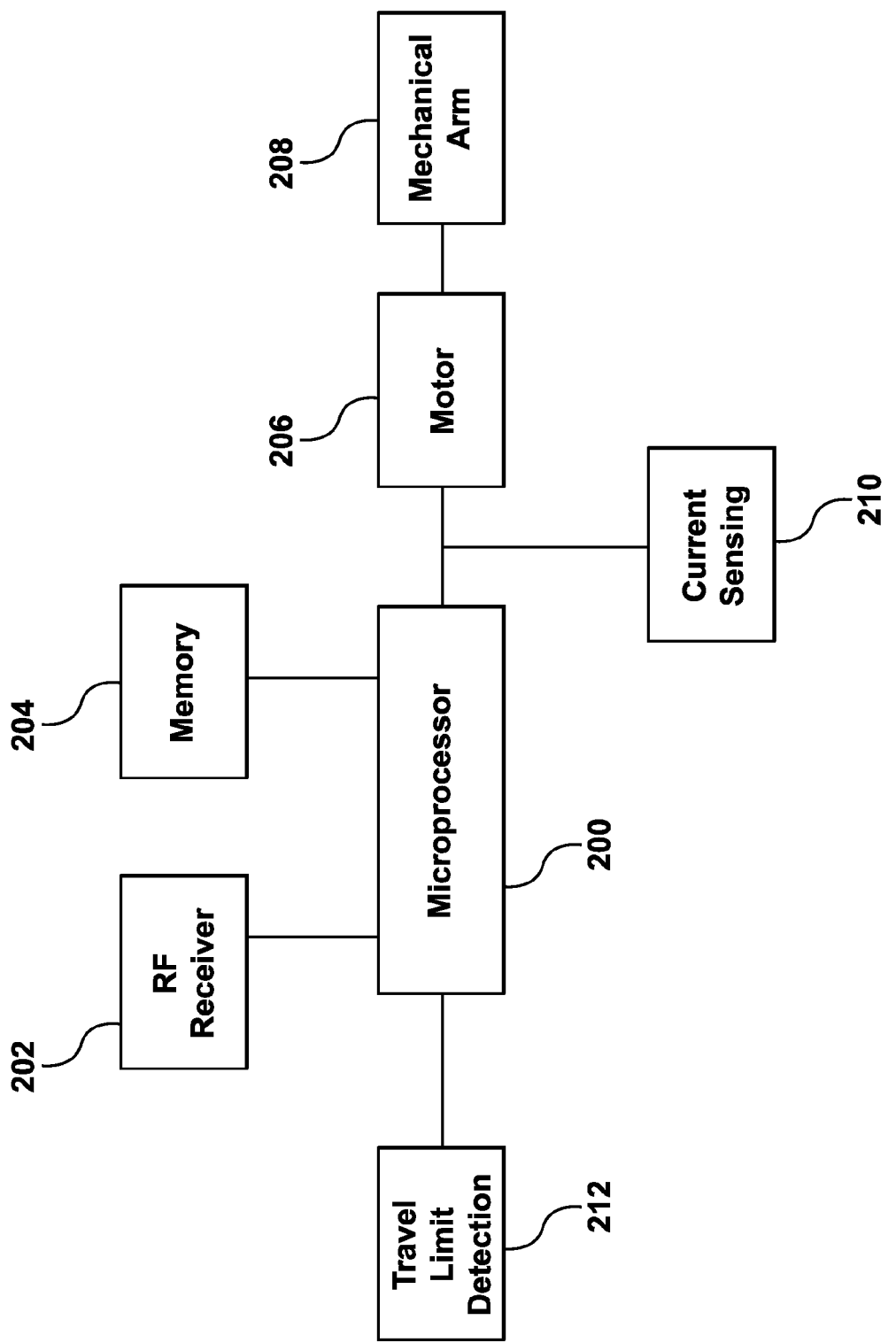
FIG. 2 illustrates a block diagram of the receiver unit of a universal remote control system in accordance with an embodiment of the present invention.

FIG. 2 shows a block diagram of the receiver unit 150. Microprocessor 200 controls all of its peripherals and acts as a main controller of the receiver unit. A wireless signal receiver, such as radio frequency (RF) receiver 202, is connected to the microprocessor, its function being to receive wireless control signal from remote controls 160. A memory device 204 is used to store user's information such as the unique identity of each programmed remote control 160. When a wireless signal is received, microprocessor can use the unique identity information, such as unique transmitter identification code, to determine whether the signal is from a programmed, i.e., recognized, remote control. If it is from a programmed remote control, microprocessor 200 will respond to the recognized wireless control signal; if the wireless signal is not from a recognized remote, it will simply ignore the unrecognized signal.

An electric motor 206 is connected to the microprocessor. The microprocessor 200 controls the operation of the electric motor, including when to energize the electric motor and in which direction. According to one design, electric motor 206 is a direct current (DC) motor, and therefore by applying a positive voltage, the DC motor will turn in one direction and by applying a negative voltage, the DC motor will turn in the opposite direction. Thus, a DC motor has the advantage of easy control, i.e., its rotation direction can be easily controlled by applying a positive or a negative voltage, keeping the design as simple as possible. A DC motor also has the advantage of a relatively small size. In addition, its controlling circuitry requires only minimal components, therefore keeping the overall size of the unit to be minimal. A mechanical arm 208 is attached to the DC motor. The mechanical arm is driven by the electric motor 206. Its distal end is moved in a reciprocal motion, such as up and down. Such up and down action can be used to depress and activate a push button of a garage door opener.

A sensing arrangement is provided to sense whether the pushbutton is fully, or at least sufficiently, depressed by the mechanical arm, i.e., to sense whether the pushbutton switch is in an engaged state. Upon detecting such a signal, i.e., upon detection of the switch in an engaged state, microprocessor is programmed to stop moving the mechanical arm to depress the pushbutton any further. It may stop the motor or may be programmed to reverse the direction of mechanical arm, for example, by reversing the rotational direction of the DC motor to lift the mechanical arm. It is possible to configure the sensing arrangement to sense directly whether the pushbutton switch is in an engaged state (e.g., by detecting electrically an electric connection formed between connection terminals of the switch) and communicate that state to the microprocessor. However, it tends to be more convenient for a user to install the unit if the sensing arrangement is configured to sense a resistance force experienced by the mechanical arm or the electric motor. For example, an actuation force feedback element may be used to detect the force between the finger and the pushbutton. The feedback element may detect the force exerted by the finger (or mechanical arm) on the pushbutton to detect when the pushbutton switch is in the engaged state. The feedback element also may be a current sensing element 210 that provides resistance feedback to the microprocessor. According to one embodiment, the feedback element is a current sensing element 210. Current sensing element 210 is placed between microprocessor 200 and motor 206 to monitor the current when the mechanical arm is being lowered. When the arm is lowered, the finger of the mechanical arm will make physical contact with the push button. When the button is fully depressed, the arm cannot go any further. Keeping energizing the electric motor will cause the current to increase. The current increase may be used as feedback signal to indicate an increase in the resistance. When the current reaches a pre-set threshold, this informs the microprocessor that mechanical arm has made contact with the push button and this is also a confirmation that the push button is depressed fully. Upon detecting that the current increase reaches this pre-set threshold, the microprocessor is programmed to reverse the direction of mechanical arm. For a DC motor, this can be done by reversing the direction of the DC current applied to the DC motor.

Travel limiter, or travel limit detection 212 is used to detect the highest point of travel of the mechanical arm, i.e., the maximum distance the mechanical arm's finger can be moved away from the pushbutton switch. This position may be used during installation to fully raise the arm, thereby providing an easier installation environment for the user to install the receiver unit next to the push button.

Figure 3A:
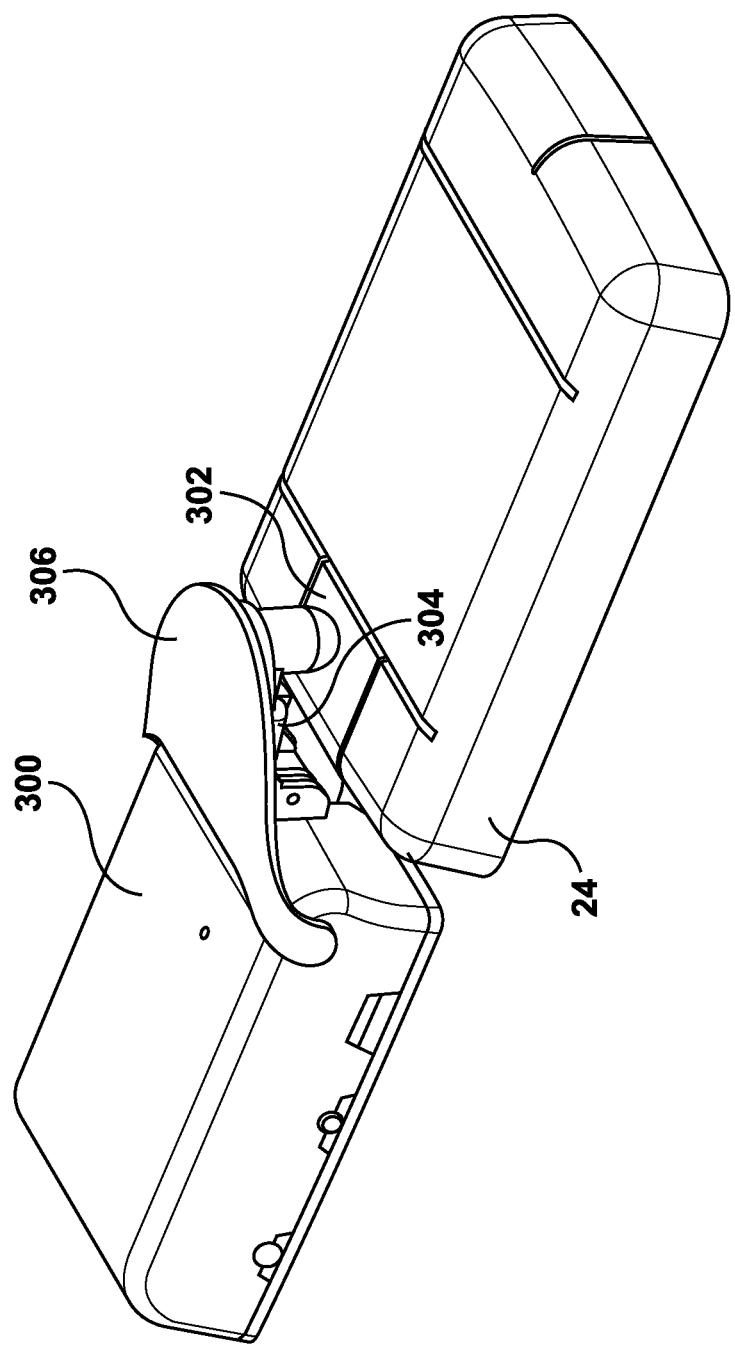
FIG. 3A shows in a perspective view an example of a mechanical arm design of the receiver unit.

FIG. 3A shows an example of mounting a receiver unit 300 next to a pushbutton switch of a wall console 24. The mechanical arm of the receiver unit is installed just above the pushbutton 302 of a wall console or the pushbutton switch. When the movable mechanical arm 304 is lowered by the DC motor as controlled by the microprocessor, it will make contact with and depress the pushbutton 302 of the switch, thereby activating the garage door opener 10. A manual override mechanism with a cover 306 is also desired. Cover 306 can be pressed down manually, overriding the control by microprocessor. When a user wants to press the push button manually without using a remote control, it can be done by pressing onto the cover 306, which will press down the pushbutton 302, as will be further described below.

Figure 3B:
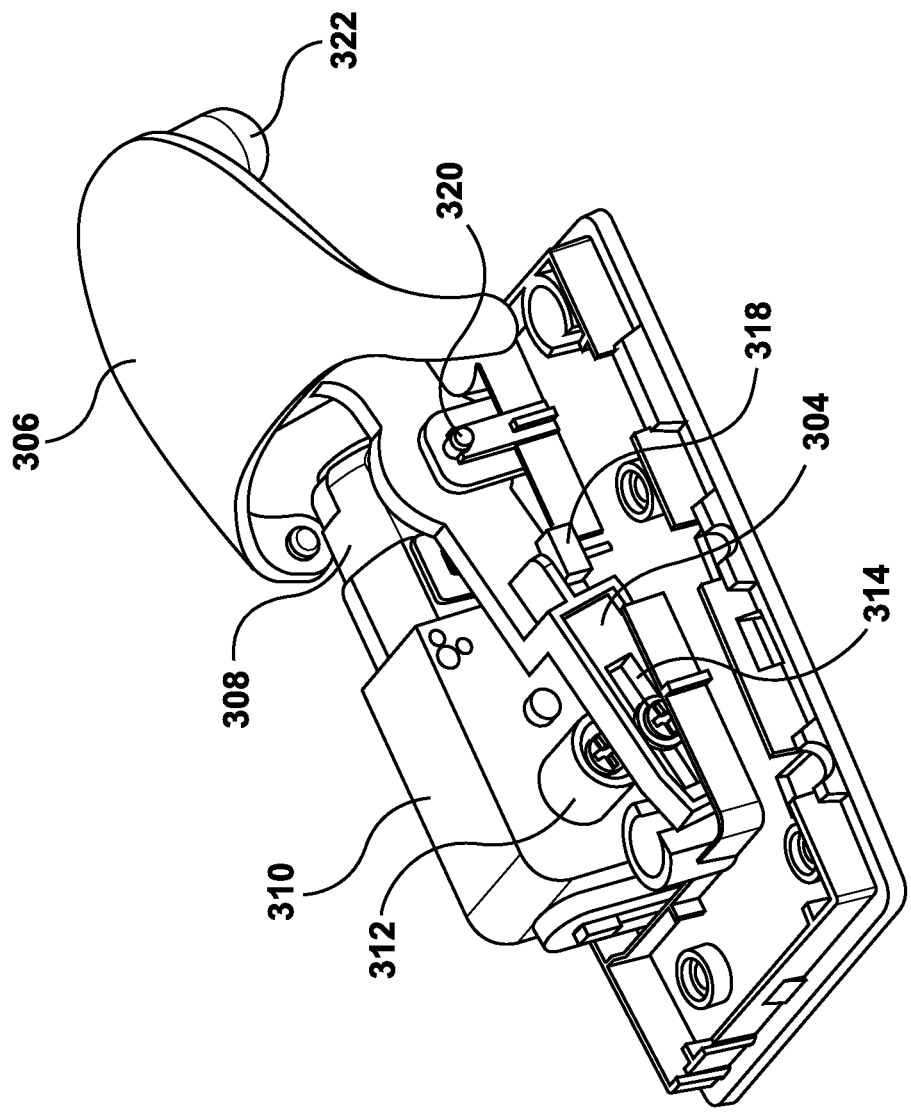
FIG. 3B shows in a perspective view an example of a receiver unit, with its cover removed for clearer illustration.

FIG. 3B shows an exemplary mechanical design of a receiver unit. Its cover is omitted for clearer illustration. The receiver unit has a DC motor 308. A gearbox 310 is used to reduce the rotation speed at its output end from the motor's rotation speed while increasing the torque output. Gearbox 310 may have multiple gears so the output from the DC motor with a characteristic of high speed/low torque can be converted to an output with very slow speed but high torque. Output of the gearbox 310 is transmitted to the mechanical arm 304 through coupler 312. Coupler 312 has a connection shaft that is offset from the rotational axis of coupler and is slidely disposed in slot 314 on the mechanical arm. This slot allows the circular motion from the coupler to be converted to translational reciprocal motion. A pivot point 320 is fixed to the base of the receiver unit. When the coupler 312 rotates, it will cause the arm to pivot about pivot point 320, thereby tilting up and down. Thus, finger 322 at the distal end of the arm moves in an up and down reciprocal motion. This up and down motion causes the finger 322 at the distal end of the arm to push down and release the push button 302. Travel limiter, in the nature of a travel limit switch 318, is used to detect when the arm reaches the highest position, i.e., the maximum distance away from the pushbutton. This travel limit switch 318 may be placed below or above mechanical arm 304. FIG. 318 illustrates an example of placing the switch below the mechanical arm. With this placement, the limit switch is normally in closed position because it is depressed by the mechanical arm. When the arm is raised high enough, the arm will no longer depress the switch and the switch will be changed into open position, thus creating an open electrical circuit and indicating to the microprocessor that the arm has reached the highest allowed position. This travel limit mechanism is useful when installing the receiver unit to the pushbutton switch. By raising the arm to the highest position, it provides more room for a user to place the receiver unit and the arm above an existing push button switch.

Figure 3C:
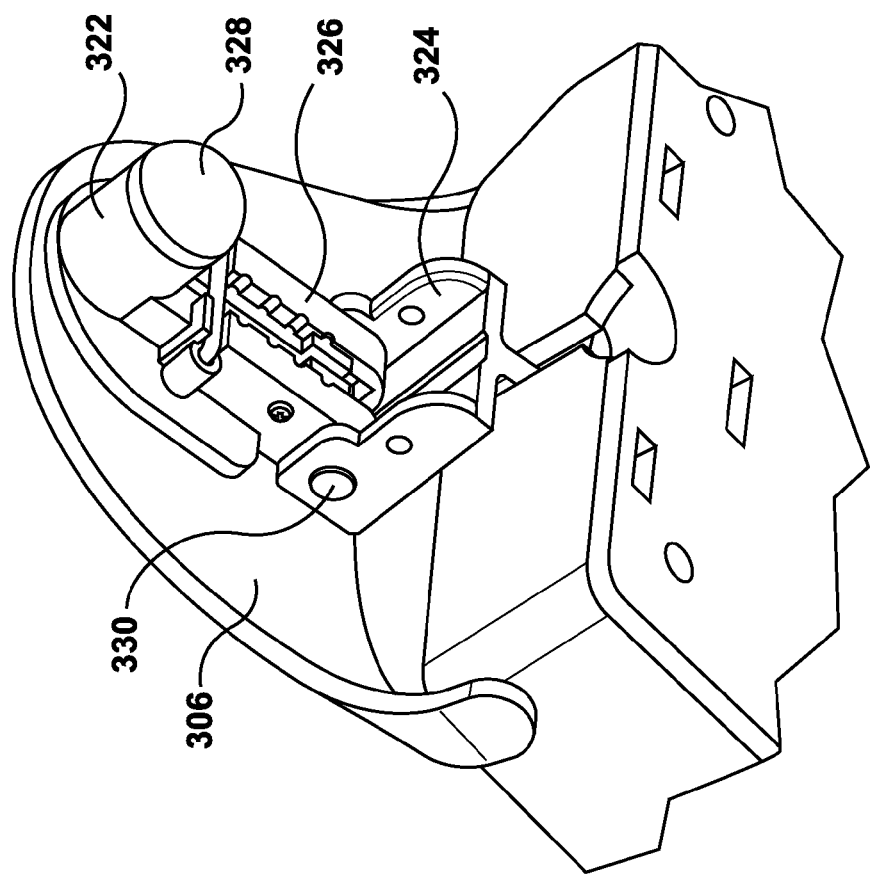
FIG. 3C shows the detailed construction of the mechanical arm of the receiver unit shown in FIG. 3A.

FIG. 3C shows the detailed construction of the mechanical arm where it makes contact with the push button. A pad in the nature of plastic piece 328 is provided at contacting surface of finger 322 for making actual contact with the push button. This may also be a convenient location for installing a sensor (not shown) for detecting force between the finger and the pushbutton. To facilitate adjustment of arm length, the mechanical arm comprises a main arm 324 and an extension arm 326. Extension arm 326 is attached to and extends from the main arm 324. The extension arm 326 has a telescopic construction, thus allowing its length to be adjusted. The total length of the mechanical arm may be adjusted, for example, by adjusting the length of the extension arm. When the push button is far away from the edge of the wall console, the extension arm can be pulled to increase the length of the mechanical arm so the finger can still reach the push button. The whole extension assembly may be pivotally connected to main arm 324 at pivot point 330, to further assist the manual override operation. Cover 306 is also pivotally joined to the receiver housing and may act as a lever. When a user manually press down cover 306, mechanical arm 304, in particular, main arm 324, is pressed down, with extension arm 326 pivoting down further from main arm 324, which presses down finger 322 to depress the pushbutton.

Figure 4:
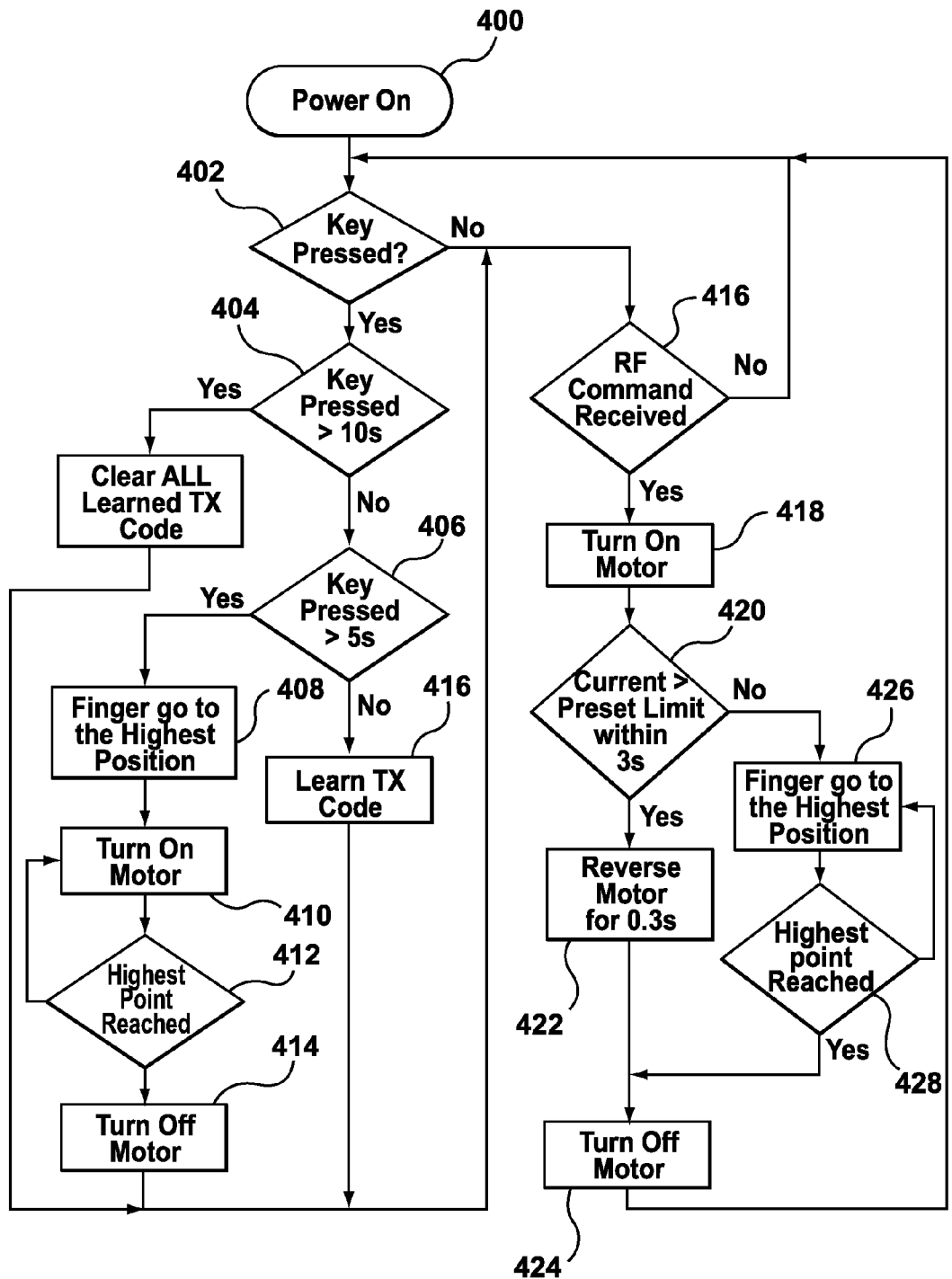
FIG. 4 illustrates an operational flowchart for the universal remote control system.

FIG. 4 is an operation flowchart of the universal garage door remote control system. After the system is powered on 400, the system is in standby mode. The receiver unit 150 includes a programming key. When the programming key on the receiver unit is depressed 402, the receiver unit will go into programming mode. Different programming modes are provided. Three are described here for illustration (more may be provided if required or desired). If the programming key is pressed for a first period that is relatively long, such as more than 10 seconds, as shown in block 404, the receiver unit will clear all of the stored unique transmitter identification codes (or IDs for short). If the programming key is pressed for a second period that is relatively short, such as less than 10 seconds, but longer than 5 seconds, as in block 406, the receiver unit will be placed in an installation mode. In the installation mode, the receiver unit will move the mechanical arm to the highest point, 408. Placing the arm at the highest point allows users to have more physical room to install the receiver unit next to the existing wall console. To place the arm to the highest position, the motor will first turn in one direction 410, until the limit switch 318 is activated 412. Once the switch 318 is activated, which indicates that the highest point (or maximum distance between the finger and the pushbutton) is reached, the motor will stop 414. The third programming mode is the remote control learning sequence. If the programming key is pressed for a third period that is very brief (block 408), e.g., for less than 5 seconds, it will go into learning mode to program additional transmitters, i.e., to receive and store additional transmitters' unique transmitter identification codes. Different LED indication will be shown for different programming mode so a user is made aware of exactly which operating mode the receiver unit is in.

If a RF control signal is received and such received signal contains a unique transmitter ID code that matches with one stored in the memory device (i.e., the RF command is a recognized signal), as 416, the motor will be energized by the microprocessor (block 418). The mechanical arm will then be lowered in order to depress the wall console push button. In general, the installation position of the receiver unit is such that minimal travel of the mechanical arm is required. The finger is expected to reach and fully depress the pushbutton within a short time, such as 3 seconds, shown in block 420. At this position, the DC current driving the DC motor will increase if the DC current is still applied to the motor. Once the current reaches the pre-set threshold, the motor will reverse direction for a short period, such as 0.3 second, 422, so the mechanical arm is stopped slightly above the push button. The motor then will be turned off, 424. Alternatively or in addition, the microprocessor can be programmed to energize the motor only for a pre-set period of time, such as 3 or 5 seconds or to move the distal end only for a pre-set, fixed distance and then reverse the direction of the DC current applied to the DC motor when the end of the pre-set period is reached. This will lift the mechanical arm. With this feature, the sensing element also can be made optional. This feature also can be used to deal with the situation where the mechanical arm for some reason misses the push button and is not able to activate the push button. If this happens, the current threshold will not be reached within the expected period, e.g., 3 seconds, 426. With the microprocessor being programmed to energize the motor only for a pre-set period of time, such as 3 or 5 seconds or to move the distal end only for a pre-set, fixed distance and then reverse the direction of the DC current applied to the DC motor when the end of the pre-set period is reached, the mechanical arm will be lifted at the end of this period or the travel of the distal end, thus avoiding application of excessive force to the pushbutton switch. Alternatively or in addition, when this fixed period or fixed distance is combined with the sensing of resistance, the microprocessor can be further configured to place the receiver unit in the installation mode and return the mechanical arm to the highest position 428 when the distal end misses the pushbutton, so a user can set it up again.

Various embodiments of the invention have now been described in detail. Those skilled in the art will appreciate that numerous modifications, adaptations and variations may be made to the embodiments without departing from the scope of the invention, which is defined by the appended claims. The scope of the claims should be given the broadest interpretation consistent with the description as a whole and not to be limited to these embodiments set forth in the examples or detailed description thereof.

What is claimed is:

1. A remote control system for use with a barrier control system, the barrier control system having a wall-mounted control console with a pushbutton switch, the pushbutton switch having a pushbutton, the pushbutton being depressible along a downward direction toward the pushbutton and consecutively depressing and releasing the pushbutton along the downward direction alternating the pushbutton switch between an engaged state and a disengaged state to trigger the barrier control system to open or close a movable barrier, the remote control system comprising:

a receiver unit comprising:
  a wireless signal receiver,
  an electric motor,
  a movable arm, the movable arm having a distal end adapted for depressing the pushbutton, the movable arm being driven by the electric motor to move the distal end reciprocally along the downward direction to alternate the pushbutton switch between the engaged state and the disengaged state, and
  a microprocessor communicating with the wireless signal receiver and controlling operation of the electric motor, and
the microprocessor being configured to energize the electric motor to move the distal end along the downward direction toward the pushbutton to depress the pushbutton and to urge the pushbutton switch into the engaged state upon the wireless signal receiver receiving a recognized wireless control signal from a user controlled wireless signal transmitter.

2. The remote control system of claim 1, further comprising:
a sensing arrangement coupled to the microprocessor, the sensing arrangement being configured to detect that the pushbutton switch is in the engaged state and communicate the state to the microprocessor,
wherein the microprocessor is configured to energize the electric motor to move the distal end toward the pushbutton to depress the pushbutton until the engaged state being detected and communicated to the microprocessor.

3. The remote control system of claim 1, wherein the electric motor is a direct current (DC) motor.

4. The remote control system of claim 3, wherein the microprocessor is configured to control the DC motor to move the distal end away from the pushbutton by reversing direction of DC current applied to the DC motor upon the engaged state being detected.

5. The remote control system of claim 1, wherein the microprocessor is configured to control the electric motor to move the distal end toward the pushbutton for a pre-set period of time and move the distal end away from the pushbutton after the end of the pre-set period is reached.

6. The remote control system of claim 2, wherein the sensing arrangement is configured to detect resistance to the distal end moving toward the pushbutton and use the resistance to determine if the pushbutton switch is in the engaged state.

7. The remote control system of claim 6, wherein the resistance is detected by detecting a resistance force between the distal end and the pushbutton.

8. The remote control system of claim 6, wherein the motor is a DC motor and the resistance is detected by detecting a current increase in the DC motor.

9. The remote control system of claim 8 wherein the microprocessor is configured to control the electric motor to move the distal end away from the pushbutton when the current increase reaches a pre-set threshold value.

10. The remote control system of claim 9, wherein the microprocessor controls the electric motor to move the distal end away from the pushbutton by reversing direction of DC current applied to the DC motor.

11. The remote control system of claim 1, wherein the length of the movable arm is user adjustable.

12. The remote control system of claim 11, wherein the movable arm comprises a main arm and an extension arm extending away from the main arm, the extension arm having a telescopic construction to enable a user to adjust the length of the movable arm.

13. The remote control system of claim 2, wherein the distal end is manually movable by a user to enable the user to manually actuate the pushbutton switch.

14. The remote control system of claim 13, further comprising a lever movably mounted adjacent the movable arm for a user to manually depress the distal end.

15. The remote control system of claim 2, wherein the receiver unit further comprises a transmission unit coupled between the electric motor and the movable arm, the transmission unit converting rotational output of the electric motor to reciprocal motion of the distal end of the movable arm for depressing the pushbutton.

16. The remote control system of claim 15, wherein the transmission unit converts a low torque input from the electric motor to a high torque output.

17. The remote control system of claim 1, further comprising:
a travel limiter, said travel limiter defining a maximum distance that the distal end is to be moved away from the pushbutton,
wherein the microprocessor is configured to move the movable arm away from the pushbutton until the maximum distance is reached upon the receiver unit being placed in an installation mode.

18. The remote control system of claim 1, further comprising a housing to house the receiver unit, the microprocessor and the electric motor, wherein the movable arm is pivotally connected to the housing at a pivot point and extends from the housing, pivoting of the movable arm about the pivot point driven by the electric motor causing the distal end to move in a translation motion to depress the pushbutton.

19. The remote control system of claim 2, wherein the remote control system further comprises a wireless remote control unit that includes the user controlled wireless signal transmitter.

20. The remote control system of claim 19, wherein the wireless remote control unit and the wireless receiver unit communicate in radio frequency.

21. The remote control system of claim 2, wherein the receiver unit further comprises a programming key, pressing of the programming key places the receiver unit in a programming mode, and wherein the microprocessor is programmed to erase stored transmitter identification codes when in a first programming mode, programmed to energize the electric motor to move the movable arm away from the pushbutton to a maximum distance set by a travel limiter when in a second programming mode, and programmed to receive and store transmitter identification codes received when in a third programming code.

22. The remote control system of claim 21, wherein the receiver unit is placed in one of the three programming modes according to duration of activation of the programming key, and wherein the duration of the second programming mode is shorter than the duration of the first programming mode and longer than the duration of the third programming mode.

23. The remote control system of claim 22, wherein the first programming mode has a duration longer than 10 seconds, the second programming mode has a duration between 5 seconds and 10 seconds and the third programming mode has a duration shorter than 5 seconds.

* * * * *